United States Patent [19]

Rees

[11] Patent Number: 4,563,044
[45] Date of Patent: Jan. 7, 1986

[54] LATCHING ARRANGEMENT FOR SEAT SLIDE STRUCTURES

[75] Inventor: Richard W. A. Rees, West Bloomfield, Mich.

[73] Assignee: General Motors Corporation, Detroit, Mich.

[21] Appl. No.: 709,882

[22] Filed: Mar. 8, 1985

[51] Int. Cl.$^4$ ............................................. F16C 29/10
[52] U.S. Cl. ................................... 308/3.8; 296/65 R
[58] Field of Search ................... 308/3.8, 3.6, 6 R; 312/348, 350; 296/65

[56] References Cited

U.S. PATENT DOCUMENTS

| | | | |
|---|---|---|---|
| 3,007,668 | 11/1961 | Dall | 308/3.8 |
| 3,027,202 | 3/1962 | Gottfried et al. | 308/3.6 |
| 3,037,736 | 6/1962 | James | 308/3.6 |
| 4,423,914 | 1/1984 | Vander Ley | 308/3.8 |

Primary Examiner—Lenard A. Footland
Attorney, Agent, or Firm—Herbert Furman

[57] ABSTRACT

A latching arrangement for seat slide structures includes a latch member having a body portion which is pivoted to an edge of an opening in the upper one of a pair of track members. A latch portion extends from the body portion and includes a pair of latch arms which extend opposite of each other for movement within a second opening in the one track member and any one of a plurality of openings in the other track member. The latch member is biased to latched position by a hairpin type spring mounted on the one track member.

3 Claims, 6 Drawing Figures

U.S. Patent  Jan. 7, 1986  Sheet 1 of 2  4,563,044
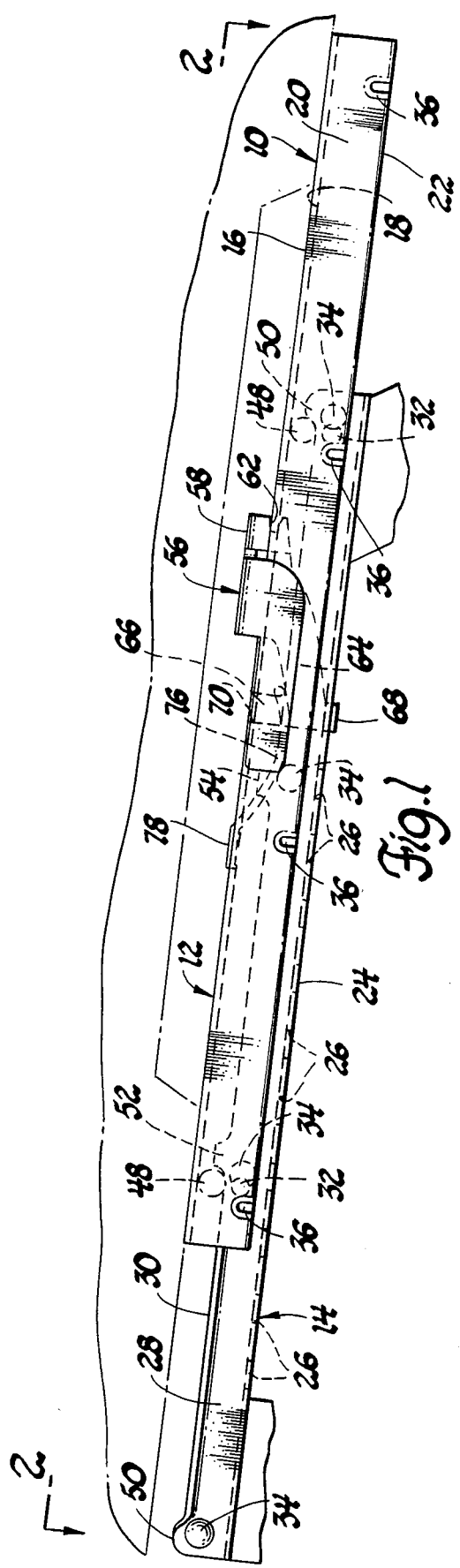
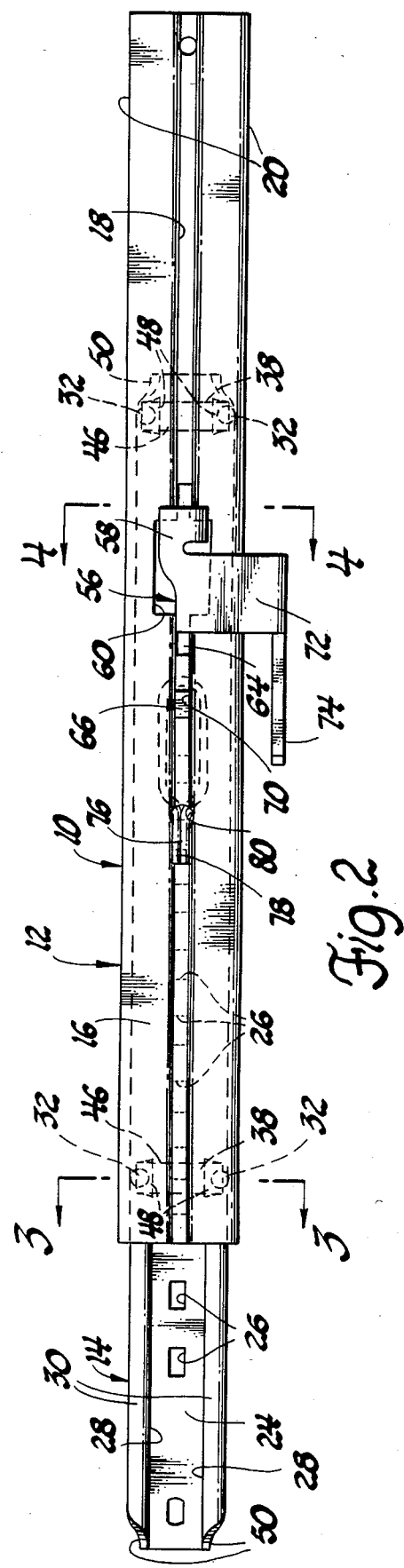

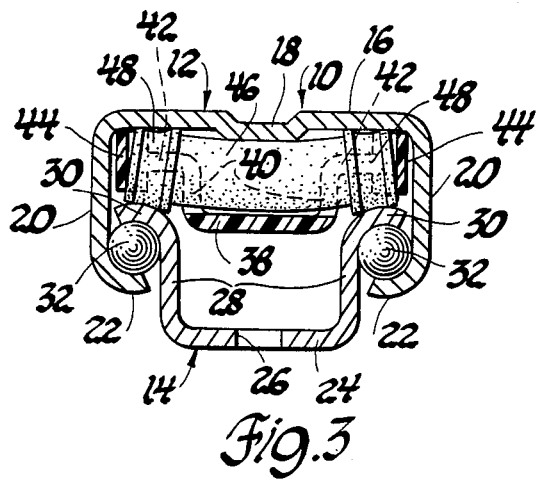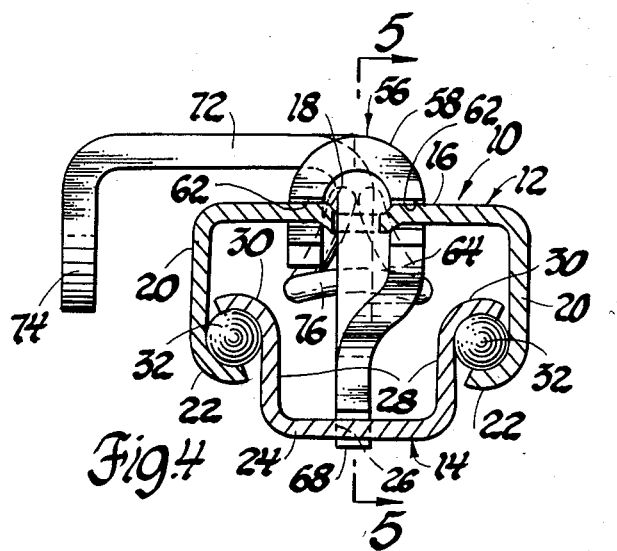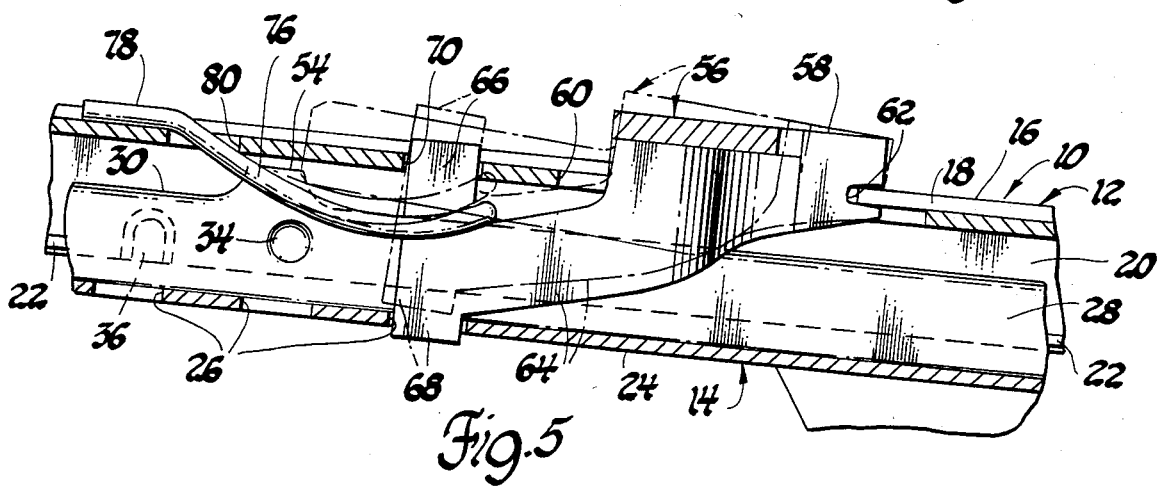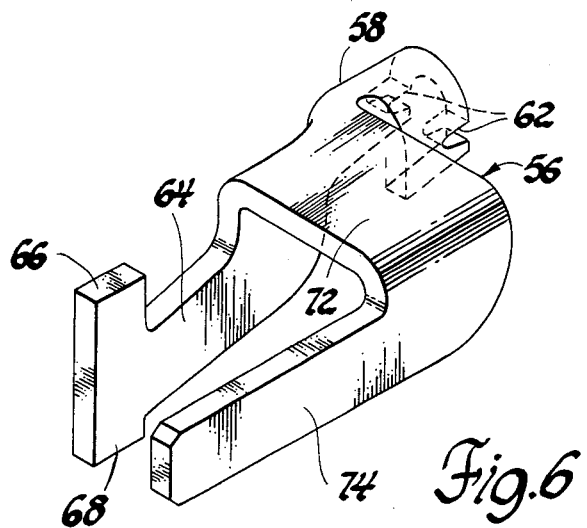

LATCHING ARRANGEMENT FOR SEAT SLIDE STRUCTURES

This invention relates generally to seat slide structures and more particularly to an improved latching arrangement for seat slide structures.

The latching arrangement of this invention is intended for use with seat slide structures of the general type including upper and lower generally U-shaped track members, with the lower track member being supported on the body and the upper track member being slidably supported on the lower track member and supporting a vehicle seat.

The latching arrangement includes a latch member having a generally U-shaped body portion which is received within an opening in the base wall of the upper track member. The body portion has a slot or groove which receives an edge portion of the opening to pivotally mount the latch member on the upper track member for movement between latched and unlatched positions with respect to the lower track member. A latch portion extends from the body portion between the track members and includes a pair of oppositely extending latch arms or lugs, one of which is always received in a second opening in the base wall of the upper track member and the other of which is receivable in one of a series of openings in the base wall of the lower track member, each such opening being pairable with the second opening of the upper track member. A hairpin type spring surrounds the one latch arm and is anchored within a third opening in the upper track member to continually bias the latch member to latched position. An operating portion extends outwardly of the upper track member from the body portion and may be actuated to pivot the latch member about its connection to the upper track member to move the latch member from latched to unlatched position against the bias of the spring.

The primary feature of this invention is that it provides an improved latching arrangement for seat slide structures which includes a latch member having a body portion pivoted within a first opening of one track member of the slide structure and having a latch portion including a pair of latch arms which are receivable within a second opening in the base wall of the one track member and one of a plurality of openings in the base wall of the other track member for releasably latching the track members to each other. Another feature is that the body portion is pivoted to an edge portion of the first opening by a slot in the body portion receiving such edge portion. A further feature is that the latch member is biased to latched position by a spring which is anchored to the one track member and is engageable with the latch portion of the latch member adjacent one of the latch arms thereof. Yet another feature is that an operating portion of the latch member extends outwardly of the one track member from the body portion for actuation to move the latch member from latched to unlatched position.

These and other features will be apparent from the following specification and drawings wherein:

FIG. 1 is a side elevational view of a seat slide structure embodying a latching arrangement according to this invention.

FIG. 2 is a plan view of the slide structure of FIG. 1.

FIG. 3 is an enlarged sectional view taken generally along line 3—3 of FIG. 2.

FIG. 4 is a sectional view taken along line 4—4 of FIG. 2.

FIG. 5 is a view taken along line 5—5 of FIG. 4 and showing the latch member in latched position in full lines and in unlatched position in dash lines, and FIG. 6 is a perspective view of the latch member.

Referring now to the drawings, a seat slide structure 10 includes an upper track member 12 and a lower track member 14. The upper track member 12 includes a base wall 16 having a depressed longitudinally extending rib 18 therein. A pair of side walls 20 extend generally normal to the base wall 16 and terminate in arcuate flanges 22. The lower track member 14 includes a base wall 24 which is juxtaposed to the wall 16 and provided with a longitudinal series of openings 26. A pair of side walls 28 extend generally normal to the wall 24 in juxtaposed relationship to respective walls 20 and terminate in arcuate flanges 30 which are juxtaposed to respective flanges 22 of the upper track 12. Spacing balls 32 fit between the juxtaposed flanges 22 and 30. The balls are limited in their movement by pairs of outwardly embossed dimples 34 in the side walls 28 of the lower track member 14 and cooperating inwardly embossed pairs of ribs 36 in the side walls of the upper track member 12.

The upper track member 12 is slidably supported on the lower track member 14 by a pair of bearing assemblies which are disclosed and claimed in copending applications Ser. No. 555,129, Rees et al, filed Nov. 25, 1983 now Pat. No. 4,511,187 and Ser. No. 709881, Rees filed 3-3-85. Each bearing assembly generally comprises a U-shaped bearing cage 38 of plastic material having slotted side walls 40 and terminal flanges 42. The slots in the flanges 42 are closed by end walls 44. A roller member of plastic material includes a center axle portion 46 and tapered grooved end portions 48. The center axle portion 46 is engaged by the rib 18 in the base wall of the upper track member 12 to bow the roller member and seat the end portions 48 on the arcuate flanges 30 of the lower track member and on the base wall 16 of the upper track member. This maintains the balls 32 in rolling engagement with the juxtaposed pairs of flanges 22 and 30. The flanges 30 of the lower track member are bent upwardly at 50 at the forward and rearward ends of the track member and at 52 and 54 intermediate these ends to provide pairs of limit stops for the end portions 48 of the roller member.

A latch arrangement according to this invention includes a latch member 56 having a generally U-shaped body portion 58 which is received within an elongated opening 60 in the base wall 16 of the upper track member 12. The body portion 58 has the legs thereof slotted at 62 to receive the rearward edge of the opening 60 to either side of rib 18 and pivotally mount the latch member on the upper track member for movement between latched and unlatched positions as will be more fully described. A latch portion 64 extends from one wall of the body portion between the base walls of the upper and lower track members and terminates in a pair of opposite extending latch arms or lugs 66 and 68, the former being movable within a second opening 70 in the base wall 16 of the upper track member and the latter being receivable in any one of the openings 26 in the base wall 24 of the lower track member, with each opening 26 being pairable with the opening 70.

An arm 72 extends laterally to the latch portion 64 and terminates in an operating portion 74 which is located outboard of and adjacent one of the side walls 20 of the upper track member 12. A longitudinally and laterally bowed or arcuate hairpin type spring 76 encircles the latch arm 66 and seats on the latch portion 64 adjacent this latch arm as shown in FIG. 5. The free ends 78 of the spring 76 extend outwardly through an opening 80 in the upper wall 16 of the upper track member. The engagement of ends 78 with wall 16 and the fulcruming of the spring on the rear edge of opening 80 provide a resilient bias on the latch member 56 biasing the latch member toward latched position as shown in full lines in FIG. 5.

When it is desired to release the latch member so that the track members can be adjusted relative to each other, the operating portion 74 or a suitable handle or member secured thereto is lifted to rotate the latch member from its full line latched position shown in FIG. 5 to its dash line unlatched position shown therein wherein the latch arm 68 is out of engagement with any one of the openings 26. After adjustment of the track members, the operating portion 74 is released and the spring 76 returns the latch member to latched position as the latch arm 68 engages another one of the openings 26 to again latch the track members to each other.

Thus this invention provides an improved latching arrangement for seat slide structures.

The embodiments of the invention in which an exclusive property or privilege is claimed are defined as follows:

1. A seat slide comprising, in combination, a pair of generally U-shaped internested track members, one track member including a base wall located in opposed spaced relationship to a base wall of the other track member, bearing means movably supporting the one track member on the other track member for movement relative thereto, the base wall of the one track member including a first opening therein and a second-opening spaced from the first opening, the base wall of the other track member including a series of openings therein, each pairable with the second opening of the first track member, a latch member including a body portion fitting within the first opening of the one track member and a latch portion located between the base walls of the track members and including a pair of oppositely extending latch arms, cooperating means on the body portion of the latch member and an edge portion of the first opening of the one track member for pivotally mounting the latch member on the one track member for movement between: (1) a latched position wherein one latch arm of the latch member projects outwardly of the second opening of the one track member and the other latch arm projects outwardly of a paired opening of the other track member, and, (2) an unlatched position wherein the one latch arm projects further outwardly of the second opening of the one track member and the other latch arm is located inwardly of and out of engagement with any of the openings of the other track member, and resilient means biasing the latch member to latched position.

2. A seat slide comprising, in combination, a pair of generally U-shaped internested track members, one track member including a base wall located in opposed spaced relationship to a base wall of the other track member, bearing means movably supporting the one track member on the other track member for movement relative thereto, the base wall of the one track member including a first opening therein and a second opening spaced from the first opening, the base wall of the other track member including a series of openings therein, each pairable with the second opening of the first track member, a latch member including a body portion fitting within the first opening of the one track member and including a latch portion located between the base walls of the track members and an operating portion located to one side of the one track member, the latch portion including a pair of oppositely extending latch arms, cooperating means on the body portion of the latch member and an edge portion of the first opening of the one track member for pivotally mounting the latch member on the one track member for movement between: (1) a latched position wherein one latch arm of the latch member projects outwardly of the second opening of the one track member and the other latch arm projects outwardly of a paired opening of the other track member, and, (2) an unlatched position wherein the one latch arm projects further outwardly of the second opening of the one track member and the other latch arm is located inwardly of and out of engagement with any of the openings of the other track member, and resilient means biasing the latch member to latched position the operating portion being actuable to move the latch member to unlatched position against the resilient means bias.

3. A seat slide comprising, in combination, a pair of generally U-shaped internested track members, one track member including a base wall located in opposed spaced relationship to a base wall of the other track member, bearing means movably supporting the one track member on the other track member for movement relative thereto, the base wall of the one track member including a first opening therein and a second opening spaced from the first opening, the base wall of the other track member including a series of openings therein, each pairable with the second opening of the first track member, a latch member including a body portion fitting within the first opening of the one track member and a latch portion located between the base walls of the track members and including a pair of oppositely extending latch arms, cooperating slot means on the body portion of the latch member receiving an edge portion of the first opening of the one track member for pivotally mounting the latch member on the one track member for movement between: (1) a latched position wherein one latch arm of the latch member projects outwardly of the second opening of the one track member and the other latch arm projects outwardly of a paired opening of the other track member, and, (2) an unlatched position wherein the one latch arm projects further outwardly of the second opening of the one track member and the other latch arm is located inwardly of and out of engagement with any of the openings of the other track member, resilient means engageable with the latch portion adjacent the one latch arm for biasing the latch member to latched position, and cooperating means on the latch portion and other track member for locating the latch member in latched position against the resilient means bias.

* * * * *